United States Patent
French et al.

(10) Patent No.: US 10,846,980 B2
(45) Date of Patent: Nov. 24, 2020

(54) AUTOMATIC JACKPOT DETECTION

(71) Applicant: TCS John Huxley Europe Limited, Stoke-on-Trent (GB)

(72) Inventors: Nicholas Richard Baker French, Stoke-on-Trent (GB); Amanda Green, Pyrmont (AU)

(73) Assignee: TCS John Huxley Europe Limited, Stoke-On-Trent (GB)

( * ) Notice: Subject to any disclaimer, the term of this patent is extended or adjusted under 35 U.S.C. 154(b) by 0 days.

(21) Appl. No.: 16/090,890

(22) PCT Filed: Apr. 3, 2017

(86) PCT No.: PCT/GB2017/050931
§ 371 (c)(1),
(2) Date: Oct. 3, 2018

(87) PCT Pub. No.: WO2017/174970
PCT Pub. Date: Oct. 12, 2017

(65) Prior Publication Data
US 2019/0108710 A1 Apr. 11, 2019

(30) Foreign Application Priority Data

Apr. 4, 2016 (GB) .................................. 1605788.7

(51) Int. Cl.
*A63F 9/24* (2006.01)
*G07F 17/32* (2006.01)
(Continued)

(52) U.S. Cl.
CPC .......... *G07F 17/322* (2013.01); *A63F 13/213* (2014.09); *G07F 17/3211* (2013.01);
(Continued)

(58) Field of Classification Search
CPC ............... G07F 17/3211; G07F 17/322; G07F 17/3223; G07F 17/3251; G07F 17/3258
See application file for complete search history.

(56) References Cited

U.S. PATENT DOCUMENTS

| 5,735,742 A | 4/1998 | French |
| 6,299,534 B1 | 10/2001 | Breeding et al. |

(Continued)

FOREIGN PATENT DOCUMENTS

| EP | 1762991 A1 | 3/2007 |
| GB | 2382034 A | 5/2003 |

(Continued)

OTHER PUBLICATIONS

International Search Report and Written Opinion dated May 11, 2017 from counterpart international application No. PCT/GB2017/050931, 15 pp.

(Continued)

*Primary Examiner* — Justin L Myhr
(74) *Attorney, Agent, or Firm* — Shumaker & Sieffert, P.A.

(57) ABSTRACT

There is described a gaming apparatus for providing an auxiliary jackpot game to a live casino table in which players may place gaming chips anywhere in a betting zone defined on the gaming table surface to signify entry in the auxiliary jackpot game. The gaming apparatus includes sensors to detect the positions of gaming chips placed in the betting zone, memory means to record the physical positions of the detected betting chips, random number generating apparatus, and processor means operable to select, on the basis of a generated random number, which of the detected positions is occupied by the winning bet. Optionally, the gaming apparatus further includes determining means for determining, on the basis of a generated random number, whether or not a jackpot payout is to be made, and the processor means (Continued)

is operated to select a winning bet position only when the determining means determines that a payout is to be made.

26 Claims, 8 Drawing Sheets (51) Int. Cl.
*A63F 13/213* (2014.01)
*A63F 3/00* (2006.01)

(52) U.S. Cl.
CPC ...... G07F 17/3223 (2013.01); G07F 17/3251 (2013.01); G07F 17/3258 (2013.01); G07F 17/3267 (2013.01); *A63F 2003/00164* (2013.01); *A63F 2003/00167* (2013.01); *G07F 17/3241* (2013.01)

(56) References Cited

U.S. PATENT DOCUMENTS

| | | | | |
|---|---|---|---|---|
| 8,285,034 B2* | 10/2012 | Rajaraman | ........... | G06Q 10/087 382/162 |
| 8,961,298 B2* | 2/2015 | Czyzewski | ......... | G07F 17/3204 463/25 |
| 2001/0036857 A1* | 11/2001 | Mothwurf | ........... | A63F 3/00157 463/25 |
| 2003/0137110 A1* | 7/2003 | Huard | ................ | A63F 3/00157 273/292 |
| 2004/0005920 A1* | 1/2004 | Soltys | .................... | G07F 17/32 463/25 |
| 2004/0051247 A1* | 3/2004 | Phillips | ............... | A63F 3/00157 273/274 |
| 2005/0272501 A1 | 12/2005 | Tran et al. | | |
| 2008/0108404 A1 | 5/2008 | Iddings et al. | | |
| 2009/0069090 A1 | 3/2009 | Moser et al. | | |
| 2009/0075725 A1* | 3/2009 | Koyama | ........... | G06Q 20/3415 463/25 |
| 2009/0115133 A1 | 5/2009 | Kelly et al. | | |
| 2010/0087241 A1* | 4/2010 | Nguyen | ............... | G07F 17/3218 463/17 |
| 2010/0093429 A1 | 4/2010 | Mattice et al. | | |
| 2010/0331074 A1* | 12/2010 | Yoshizawa | .............. | G07F 17/32 463/20 |
| 2012/0252564 A1* | 10/2012 | Moore | .................. | G07F 17/322 463/25 |
| 2013/0344937 A1 | 12/2013 | Kuhn et al. | | |
| 2014/0200071 A1 | 7/2014 | Czyzewski et al. | | |
| 2017/0103610 A1* | 4/2017 | Litman | ..................... | A63F 1/18 |

FOREIGN PATENT DOCUMENTS

| | | |
|---|---|---|
| WO | 9720605 A1 | 6/1997 |
| WO | 0186604 A2 | 11/2001 |
| WO | 2008101204 A1 | 8/2008 |
| WO | 2009026110 A2 | 2/2009 |
| WO | 2014118497 A1 | 8/2014 |

OTHER PUBLICATIONS

Search Report under Section 17 dated Oct. 10, 2016 from counterpart GB Application No. 1605788.7, 2 pp.
Written Opinion of Singaporean Application No. 11201808722T, dated Dec. 24, 2019, 10 pp.

* cited by examiner

| \multicolumn{2}{c}{Probability table} | |
| --- | --- |
| Row | Player Position |
| 1 | 2 |
| 2 | 4 |
| 3 | 1 |
| 4 | 4 |
| 5 | X1Y1 |
| 6 | 1 |
| 7 | S1 |
| 8 | 4 |
| 9 | 2 |
| 10 | S1 |
| 11 | X2Y2 |
| 12 | 2 |
| 13 | 4 |
| 14 | T1 |
| 15 | 2 |
| 16 | X3Y3 |
| 17 | 4 |
| 18 | T1 |
| 19 | X3Y3 |
| 20 | S1 |
| 21 | 4 |
| Q = 22 | T1 |

AUTOMATIC JACKPOT DETECTION

This application is a U.S. national phase application under 37 U.S.C. § 371 of international application number PCT/GB2017/050931 filed on Apr. 3, 2017, which claims the benefit of priority to GB application number 1605788.7 filed Apr. 4, 2016. The entire contents of each of international application number PCT/GB2017/050931 and GB application number 1605788.7 are incorporated herein by reference.

TECHNICAL FIELD

The present invention relates to gaming apparatus, and is particularly concerned with gaming apparatus in which a bonus game may be provided in conjunction with a main casino table game, and a method of providing an auxiliary jackpot game at one or more live gaming tables.

BACKGROUND

A casino typically offers table games to the patrons, the table games for example comprising card games such as poker and blackjack, or games of chance such as roulette, craps and Sic Bo.

Casino tables for card games typically have a number of player positions and a dealer position, marked on the table surface. Each player position typically includes a delineated "betting area", which is a section of the player position for the player to place his wager on the card game, and a separate "card area" which is a section of the player position into which the player's cards may be dealt. The dealer position includes a delineated area for the dealer to place cards for the house hand. Before each round of cards is dealt, players who wish to participate in the round place one or more betting chips in their respective betting area, and the dealer then delivers cards to each participating players part area. The betting area in which the chip or chips are placed associates that particular wager with one of the players.

Casino tables for games of chance such as roulette may have a plurality of player positions at which players may be seated round the roulette table, and a central betting area with the available betting options marked out by distinct sections of the betting area. In roulette, for example, there is an interval at the start of each game during which players are permitted to place bets on the outcome of that game by positioning one or more betting chips on a particular section of the betting area. Usually, the chips provided for each player are of a different colour or pattern from those of the other players, so that each wager may be associated with the player who placed it. At a certain point in the game, the croupier announces that no more bets are to be placed, and the result of the game is then determined by the ball settling in a pocket in the roulette wheel. Losing bets are collected, winning bets are paid out, and the table is then declared open for the placement of bets for the next game.

Additional interest and excitement may be generated at a roulette table by allowing patrons who are not seated at the table also to place bets by leaning over the seated patrons. While this does increase the number of players who can be accommodated at the roulette table, the additional workload on the croupier may slow down the rate of play, resulting in longer intervals that patrons must wait between games.

In addition to the main game being offered at the casino table, whether it be a card game or a game using a gaming apparatus such as a roulette wheel or Sic Bo dice, many casinos additionally offer patrons at the table the opportunity to participate in a jackpot game.

In jackpot games, players at the table contribute to a jackpot pool by placing "jackpot" bets in specific places on the gaming table, each place being associated with a respective player seated at the table. A jackpot may be awarded when a particular event occurs during the main game, such as a player achieving a straight flush in a poker game, or a particular number winning at roulette. Alternatively, a jackpot may be awarded in response to an event entirely unconnected with the table game, such as the total amount in the Jackpot pool exceeding a specific value.

In PCT published application WO2012100286, there is described a method for playing an auxiliary progressive jackpot game associated with a casino table game, in which the casino table is modified to provide, for each player position at the table, a receptacle on which a single betting chip of a particular value may be placed to signify that the player is participating in the jackpot game. Participation in the jackpot game is limited to only those players seated at the casino table, the player's choice simply being to enter or not to enter the jackpot game during this round of the main table game.

SUMMARY

The present invention provides, in one aspect, gaming apparatus which uses video image capture and processing to determine the positions of betting chips placed on a gaming table, and optionally also to determine the value of individual chips, and of groups or stacks of chips placed on a gaming table. Allocation of chips to associate chips placed on the table with one or more players may then be made on the basis of the position of the chip or chips on the gaming table.

In a second aspect, the present invention provides gaming apparatus which enables players other than those seated at the casino table to participate in the jackpot game, and in some embodiments enables players to select the value of the wager they place in the jackpot game.

In some casino environments, casino patrons not seated at a casino table may be able to participate in the table game via a remote gaming device linked to the gaming server. The remote device may be a mobile gaming device such as a smart phone, a tablet or other wirelessly connected device. Alternatively, the remote device may be a static gaming machine or a terminal, such as a slot machine, "fruit machine" or other gaming apparatus. Both static and mobile devices may be linked to the gaming server. A further aspect of the present invention provides gaming apparatus which enables casino patrons using a remote or mobile gaming device also to participate in the jackpot game irrespective of whether or not they are also participating in a game taking place at a table in the casino. For example, a player playing on a mobile gaming device, or on a fixed gaming apparatus such as a "fruit machine" or slot machine, may also participate in a jackpot game even though that player is not participating in a table game.

BRIEF DESCRIPTION OF THE DRAWINGS

Embodiments of the invention will now be described in detail with reference to the accompanying drawings, in which.

DETAILED DESCRIPTION

The Illustrated Embodiments

Figure 1:
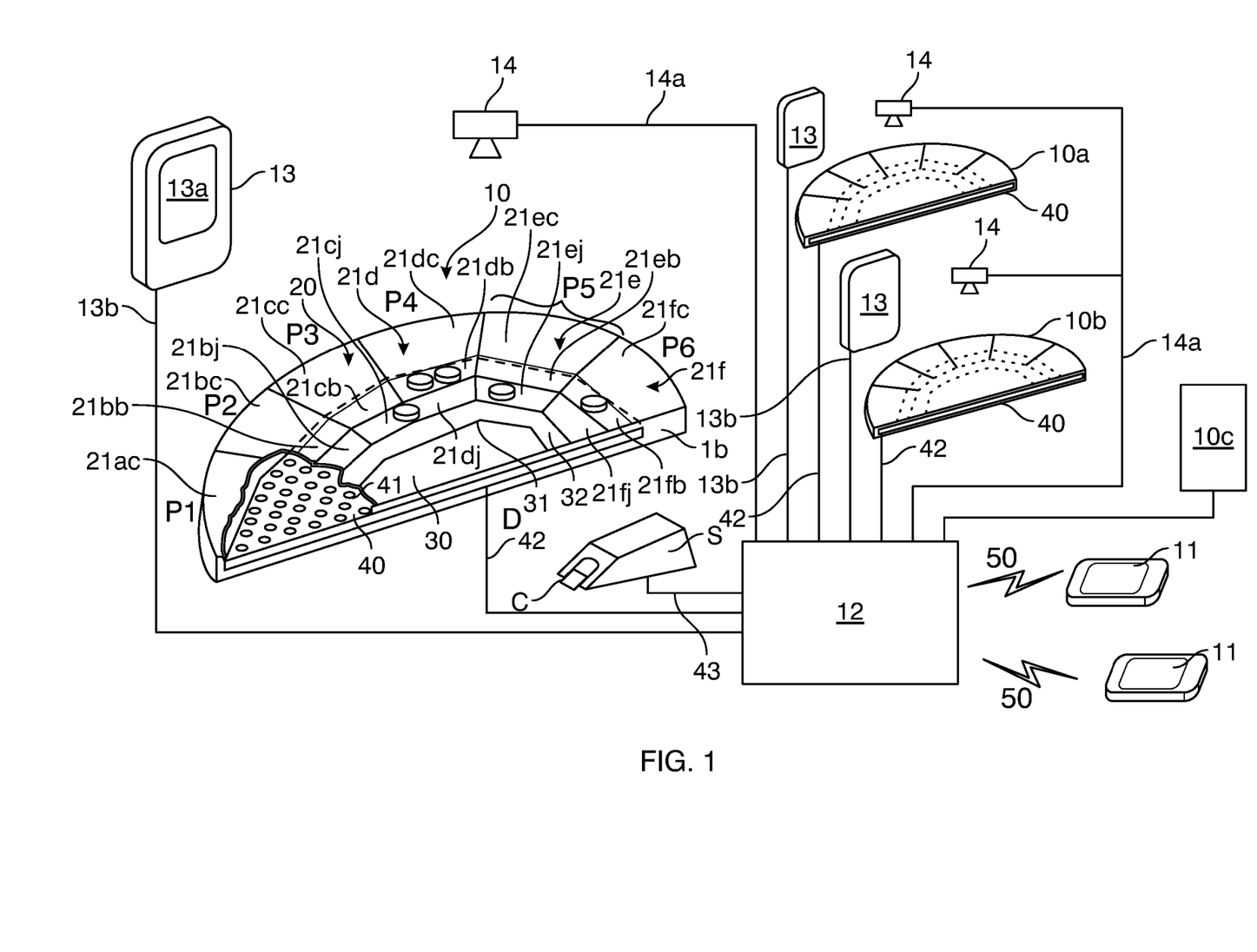
FIG. 1 is a schematic overview of a gaming system including a gaming server for providing a jackpot game in addition to casino table games at a number of gaming tables.

Referring now to FIG. 1 of the drawings, a gaming system 1 is illustrated comprising three gaming tables 10, 10a and 10b, a remote terminal 10c, and two mobile gaming devices 11, all linked to a gaming server 12. In the illustrated embodiment, the tables are linked to the gaming server 12 by hardwiring, but may be linked wirelessly via a communications network. A gaming system according to the invention may comprise more or fewer than three gaming tables, and more or fewer than two mobile gaming devices. A respective display device 13 and a respective video camera 14 is associated with each of the gaming tables 10. A card dealing shoe S for delivering playing cards C is shown schematically adjacent one of the tables. The card dealing shoe S may alternatively be placed on the gaming table, at a position reserved for it. The cameras 14, displays 13 and one or more card dealing shoes S are linked to the gaming server 12, in the illustrated embodiment by respective signal lines 14a, 13b and 43. Alternatively, the cameras 14, displays 13 and card dealing shoes S may be linked to the gaming server 12 by a wireless communication system.

In the illustrated embodiment, each of the tables 10 is generally semicircular in form, with an arcuate side 1a and a straight side 1b. The table may of course be of any shape, as appropriate to the table game being played. The illustrated table has a baize playing surface 20, delineated to provide a number of playing areas 21a to 21f each corresponding to a player position P1 to P6 arranged around the arcuate side of the table 10. At the centre of the straight side of the table is a dealer position D. Adjacent the dealer position D, a dealer's area 30 is marked on the baize playing surface 20, bounded by a boundary line 31 and by a part of the straight side of the table.

The baize playing surface 20 may be delineated by having lines printed or otherwise marked on the baize to separate the playing areas 21a to 21f. Each of the playing areas 21a to 21f has a card area 21ac to 21fc adjacent the arcuate edge of the table, on which the player's cards will be placed during play. Adjoining each card area is a player's betting area 21ab to 21fb, in which each player will place his bet for the next round of the main card game being played on the table. In the example illustrated in FIG. 1, the player seated at player station P4 has placed two betting chips in his betting area 21db, and the player seated at player station P6 has placed one betting chip in his betting area 21fb.

Next to each player's betting area 21ab to 21fb is the player's jackpot bet area 21aj to 21fj. In the illustrated embodiment in FIG. 1, the player at player station P3 has placed a chip in his jackpot bet area 21cj, and the player at player station P5 has placed a chip in his jackpot bet area 21ej.

In an arcuate region between the player's betting areas 21ab to 21fb and the boundary line 31 surrounding the dealer's area 30 is a jackpot bet zone 32. In this zone, betting chips may be placed by players other than those seated at the table in the player positions P1 to P6, and constitute bets in the next round of the jackpot game.

As can be seen in FIG. 1, the left-hand side of the baize surface 20 is shown cut away, so that an LED display board 40 mounted beneath the baize surface 20 and supporting an array of upwardly-directed LEDs 41 may be clearly seen. The LEDs 41 and the baize surface 20 are selected such that light from the LEDs is visible through the baize surface. The LED display board 40 may extend beneath the baize surface 20 over the entire area of the table. Alternatively, the LED display board may extend beneath only part of the baize surface 20. In a further alternative, a number of separate display boards may be mounted beneath respective areas of the baize surface 20. In the illustrated embodiment, the LED display board 40 extends beneath the player's betting areas 21ab to 21fb, beneath the player's jackpot bet areas 21aj to 21fj, beneath the jackpot bet zone 32 and beneath the dealer's area 30.

The LED display board 40 is linked to the gaming server 20 to receive control signals for controlling the operation of the individual LEDs 41 to provide illumination and/or graphics and/or animation visible through the baize surface 20, as will be described below. In the illustrated embodiment, a signal cable 42 links the LED display board 40 to the gaming server 12. Each of the LEDs 41 may be a three-colour LED, and may be visible through the baize surface 20 as if it were a pixel of an image being displayed by the display board 40.

A display module 13 having one or more display screens 13a is mounted so as to be visible to the players at and around the table 10. The display module 13 is linked to the gaming server to receive control signals to control the display 13a. In the illustrated embodiment the display module 13 is linked to the gaming server 12 by a signal cable 13b. The display module 13 may display, for the information of the players, data relating to the game being played on the casino table 10, and/or data relating to the current state of the jackpot game. For example, the current jackpot bonus pool total or totals may be displayed, with information indicating the last time a jackpot was awarded. The display module 13 may also information unrelated to the table game, such as a news bulletin, restaurant menu or promotional material.

In the illustrated embodiment, a video camera 14 is mounted above the gaming table 10 so as to record images of the gaming table, betting chips placed on the gaming table, and optionally also images of the players surrounding the table. The video camera 14 is connected to the gaming server 12 by a signal cable 14a in the illustrated embodiment. More than one video camera 14 may be provided, each camera looking obliquely downwardly onto the gaming table so as to be able to "see" the side of a stack of chips placed on the table and thus enable the video processing circuitry to determine not only the position of the stack of chips on the table, but also to determine the number of chips and optionally the value of each chip in the stack.

The gaming server 12 may also be connected to the LED display boards 40 of further gaming tables 10, by further signal cables 42. Likewise, the further gaming tables 10 may be equipped with display modules 13 and video cameras 14, connected to the gaming server 12 by signal cables 13*b* and 14*a*, respectively. Each table comprises one or more video cameras 14 to detect chips placed on the table, and to provide to the gaming server position data for a detected betting chip or chips which also identifies the table on which the chip or chips have been placed.

The gaming apparatus may comprise one or more additional terminals 10*c* remote from the gaming tables 10. Each terminal 10*c* may, for example, be a gaming apparatus such as a fruit machine or slot machine, and may be provided with a selector for the user to select a jackpot game, and an input device for the user to indicate the placing of a wager in a jackpot game. The terminal may further include display means to indicate to a user whether his wager in the jackpot game has been successful.

The gaming apparatus may further comprise one or more mobile gaming devices 11, connected to the gaming server 12 by one or more wireless communication systems 50, schematically represented in FIG. 1. Likewise, the one or more mobile gaming devices 11 may be provided with a selector for the user to select a jackpot game, and an input device for the user to indicate the placing of a wager in a jackpot game, and may further include display means to indicate to a user whether his wager in the jackpot game has been successful.

The Gaming Server

Figure 2:
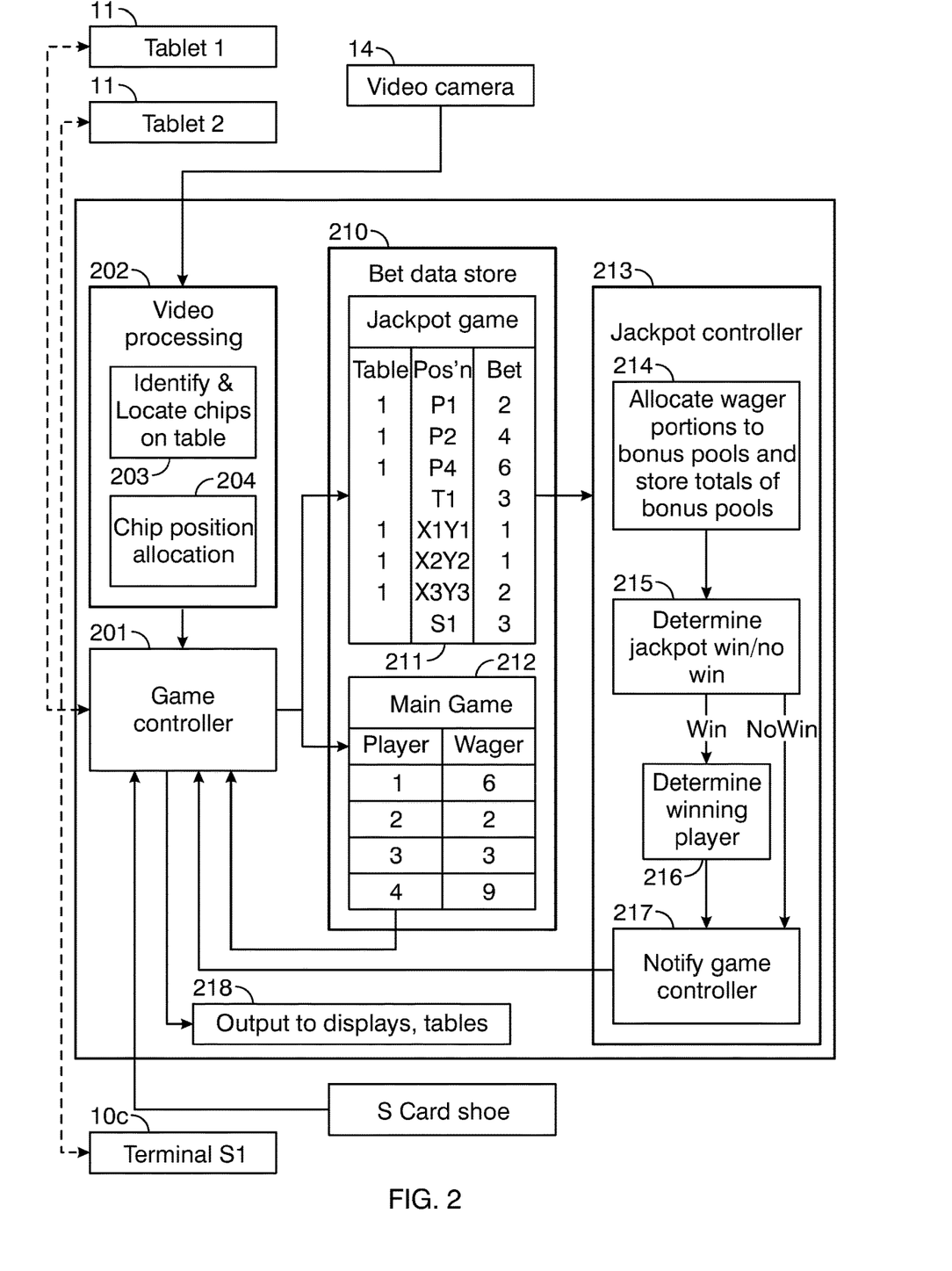
FIG. 2 is a block diagram showing the principal components of the gaming server.

The gaming server 12 and its sub-systems is illustrated in more detail in FIGS. 2 to 7. Referring to FIG. 2, the gaming server 12 includes a game controller 201 which receives inputs and provides outputs for the operation of the main table game.

For example, the game controller 201 may receive inputs from the card dealing shoe S to indicate which cards have been dealt to which player, so that the game controller may determine each player's options in the game, and the eventual winner of each round of the main table game. The time at which each card is dealt may be recorded, in order to provide data as to the speed of progress of the game.

The gaming server 12 also includes a video processing unit 202 which receives inputs from the video cameras 14 mounted above the respective gaming tables 10. The video processing unit 202 includes a position determining module 203 which determines, from the video images, the positions of betting chips placed on each of the gaming tables 10. The position determining module may also serve to determine the value of a betting chip, for example by determining its size, shape, colour and/or patterning.

Having determined the position (and optionally the value) of each betting chip on a gaming table, a chip allocation module 204 compares the detected position of each chip with the positions of the betting areas 21*ab*, 21*bb*, 21*cb*, 21*db*, 21*eb* and 21*fb* of the table which are associated with the respective player positions at that table. If the chip allocation module determines that a particular chip is positioned within one of the betting areas 21*ab* to 21*fb* associated with a player, data is sent to the game controller to indicate that that player has placed a chip as a bet in the main table game, for example the data may indicate that the player at player position P1 at table number 2 has placed a chip of value 5 units as a bet in the main table game.

The chip allocation module 204 also compares the detected position of each chip with the positions of the players' jackpot bet areas 21*aj* to 21*fj*, and if the chip allocation module determines that a particular chip is positioned within one of the players' jackpot bet areas 21*aj* to 21*fj*, data is sent to the game controller to indicate that that player has placed a chip as a bet in the jackpot game, for example the data may indicate that the player at player position P3 at table number 2 has placed a chip of value 2 units as a bet in the jackpot game.

If the chip allocation module 204 determines that the chip is within the area 32 of the table on which players not seated at the table may place jackpot bets, then data is sent to the game controller identifying the physical position (and optionally the value) of the chip, and indicating that a chip at that position has been placed as a jackpot bet. If a group of two or more chips has been placed in the area 32 with the chips in touching or overlapping relation or as a stack, the chip allocation module 204 determines how many chips are in the group and determines a mean position for the centre of the group, and passes data to the game controller indicating a position for the group and a total representing either the number of chips in the group or the total value of the chips in the group. For example the data may indicate that at position XY on table number 1 a chip of value 5 units has been placed as a bet in the jackpot game.

The video processing circuitry may be arranged such that it detects not only the position of the chip, but also the colour of the chip, or some other attribute (such as shape or pattern) which is associated with the chip having a particular value in the game. The video processing circuitry may then provide to the game controller a total value represented by the chips placed in a particular betting area, or in a group in the betting area 32.

In addition to bets placed on the gaming table 10 by the seated players at P1 to P6, and others who place their jackpot bets in the area 32, users of remote terminals 10*c* and mobile gaming devices 11 may place bets on the jackpot game by making appropriate inputs to their respective mobile gaming devices. The remote terminal 10*c*, or the gaming device 11, then sends a signal to the game controller 12 identifying itself and the specifying amount wagered by the player.

Information received by the game controller 201 concerning the wagers placed in relation to the table game and the jackpot game being played on the table 10 is compiled and stored in a bet data store 210. The bet data store 210 maintains a jackpot game betting table 211 in relation to each jackpot pool, and a main game betting table 212 for each of the gaming tables 10. In some embodiments, the bet data store 210 may maintain a separate jackpot game betting table 211 for each of the gaming tables 10, or may maintain a number of jackpot game betting tables 211 each in respect of a group of gaming tables 10.

In the Main game betting table 212, each of the seated players who places a bet in his respective betting area 21*ab*-21*eb* has the amount of his wager recorded in the main game betting table 212 in association with his table position P1 to P6. A main game betting table 212 may be maintained separately for each of the gaming tables 10 where table games are being offered, particularly if each gaming table 10 offers a different main table game.

In the Jackpot game betting table 211, chips detected in the jackpot bet areas 21*aj* to 21*fj* of the respective players are recorded in the jackpot game table in association with the table position P1 to P6 of the player. Where the jackpot game is being played over a plurality of gaming tables, the jackpot game betting table 211 also includes an identifier to identify the gaming table 10 at which the player is seated.

Each player who places a jackpot bet using a mobile gaming device 11 has the amount of his wager recorded in the jackpot game betting table 211 in association with an identifier for his mobile gaming device T1, T2 etc.

Likewise, each player at a remote terminal or slot machine 10*c* who places a jackpot bet has the amount of his wager recorded in the jackpot game betting table 211 in association with an identifier for his terminal or slot machine S1 etc.

The jackpot game betting table 211 also stores the position and amount data relating to betting chips or groups of betting chips placed in the jackpot bet zone 32, by recording the position of each chip or group of chips, together with its total value. Where the jackpot game is being played over a plurality of gaming tables, the jackpot game betting table 211 also includes an additional column indicating the gaming table 10 on which each of the participating wagers has been placed.

The jackpot game betting table 211 shown in FIG. 2 represents jackpot bets placed by three players seated at a single gaming table, three bets placed in the jackpot bet zone 32, a jackpot bet placed by a user of a mobile gaming device, and a jackpot bet placed from a remote terminal. The jackpot game betting table 211 indicates that the player on table 1 at position P1 has bet two units, the player on table 1 at position P2 has bet for units, the player on table 1 at position P4 has bet six units, the user of mobile gaming device T1 has bet three units, a player has placed a bet of one unit at position X1Y1 in the jackpot bet zone 32 of table 1, a player has placed a bet of one unit at position X2Y2 in the jackpot bet zone 32 of table 1, a player has placed a bet of two units at position X3Y3 in the jackpot bet zone 32 of table 1, and the user of a remote terminal S1 has placed a bet of three units. Thus the total amount bet on the jackpot game is 22 units, with eight participating wagers. The three bets placed in the jackpot bet zone 32 may have been placed by the same player, or by up to three different players.

Data from the main game betting table 212 is used by the game controller 12 to determine payouts to be made to winning players at the end of each round of the main table game, and to keep track of the amounts wagered, et cetera, for accounting purposes.

Figure 3:
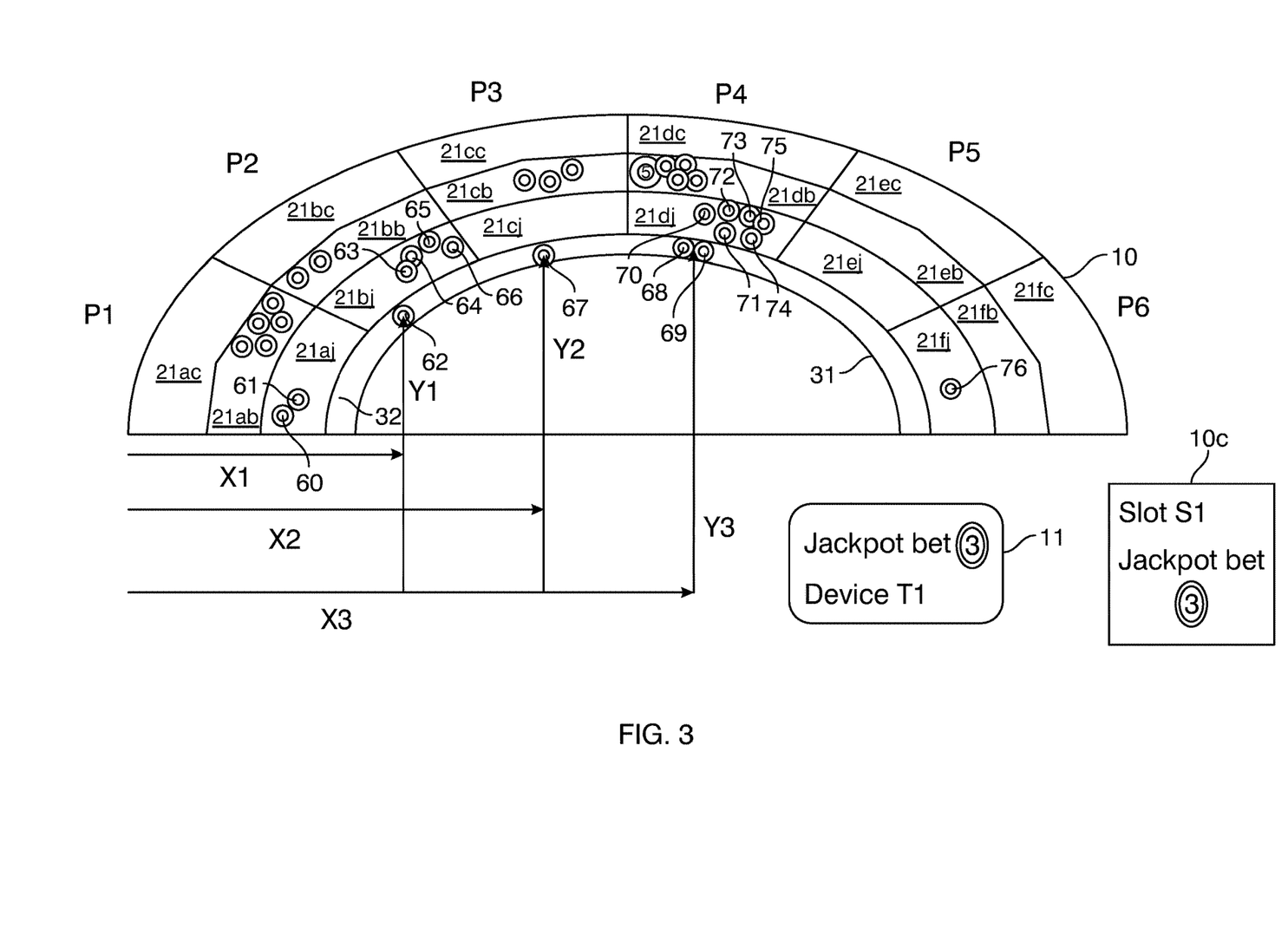
FIG. 3 illustrates an example of betting chips placed on a gaming table.
Figure 4:
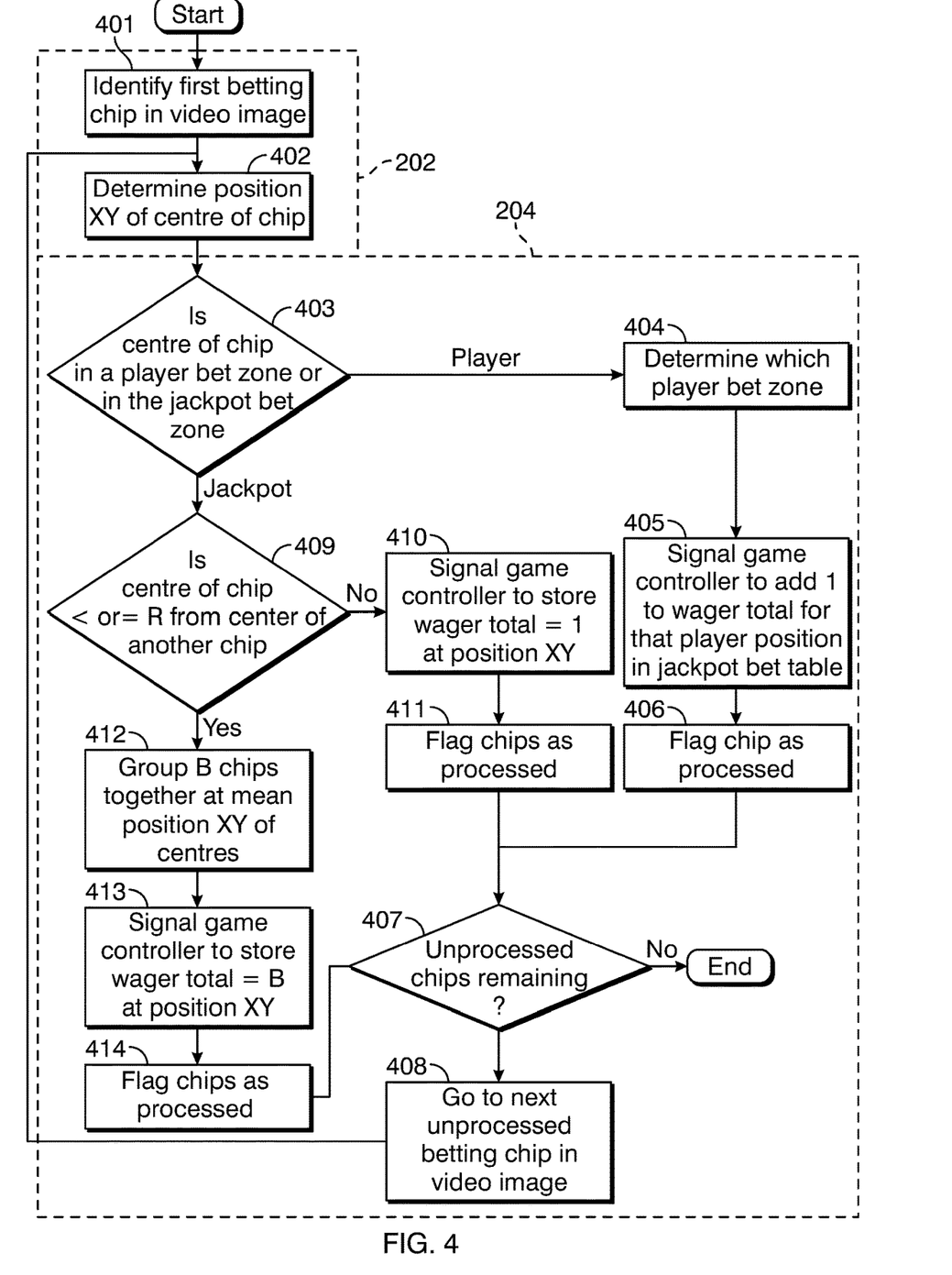
FIG. 4 schematically illustrates the detection and allocation of gaming chips.

Concentrating on the jackpot game betting table 211, FIGS. 3 and 4 show an example of a number of jackpot bets placed on a gaming table 10, and an example of how the corresponding jackpot game betting table 211 may be compiled by the game controller 201 and stored in the bet data store 210 shown in FIG. 2.

FIG. 3 illustrates an example of a plurality of betting chips 60-75 placed on the jackpot betting areas of the gaming table 10.

In the jackpot bet area 21$aj$ corresponding to player position P1, two betting chips 60 and 61 are seen.

In the jackpot bet area 21$bj$ corresponding to player position P2, four betting chips 63 to 66 are seen. Betting chip 63 has been placed so as to partially overlie betting chip 64.

In the jackpot bet zone 32 adjacent jackpot bet area 21$bj$, a single betting chip 62 is placed.

Likewise, in the jackpot bet zone 32 adjacent jackpot bet area 21$cj$, a single betting chip 67 is placed.

In the jackpot bet zone 32 adjacent jackpot bet area 21$dj$, two betting chips 68 and 69 are placed in touching relationship.

In the jackpot bet area 21$dj$ corresponding to player position P4, six betting chips 70 to 75 are seen. Betting chip 75 has been placed so as to partially overlie betting chips 73 and 74.

Finally, in the jackpot bet area 21$fj$ corresponding to player position P6, a single betting 76 is seen.

Likewise, in the player's betting area 21$ab$ of player P1, there are six chips. In betting area 21$bb$ of player P2 there are two chips, in betting area 21$cb$ of player P3 there are three chips, and in betting area 21$db$ of player P4 there are nine chips, made up of one large chip of face value five units and four chips each of one unit.

The camera 14 captures an image of the table and the betting chips. Image processing circuitry then scans the image and identifies the positions of each of the betting chips, and may also identify the colour, size and/or shape of a chip and allocate a value to the chip on the basis of that detection.

The processing circuitry then processes each detected chip sequentially, to determine if the chip is in a player bet area 21$ab$ to 21$fb$, in a player jackpot zone 212$aj$ to 21$fj$, or in the jackpot betting zone 32. The processing circuitry then determines, for chips which are in the jackpot betting zone 32, whether the chip is part of a group of betting chips.

For example, the processing circuitry scans the image at step 401 and identifies the shapes of betting chips on the gaming table. At step 402, the XY position coordinates of the centres of the identified betting chips are determined.

Processing then moves to the chip allocation module 204. In step 403, the coordinates of the centre of chip 60 are compared with coordinate values which represent the jackpot bet zone 32, and coordinate values which represent the individual players' bet areas 21$ab$ to 21$fb$ and the individual players' jackpot bet areas 21$aj$ to 21$fj$, to determine if the chip 60 is positioned in the jackpot bet zone, in a player jackpot bet area or in a player bet zone.

The result of this determination is that the betting chip 60 lies within a player jackpot bet area 21$aj$. Processing then moves to step 404, where it is determined that player jackpot bet area 21$aj$ is associated with player position P1.

At step 405, the chip allocation module 204 sends a signal to the game controller to add 1 to the jackpot wager total for player position P1, and the jackpot bet table 211 is updated.

At step 406, the betting chip 60 is flagged as having been processed, and processing moves to step 407 to determine whether any unprocessed chips remain in the captured image. Since all the chips have not yet been processed, processing returns to step 402 to locate the next chip which in this example is chip number 61. This chip is also in the player jackpot bet area 21$aj$ associated with player P1, and thus the result of the processing is that the jackpot game betting table 211 is updated to show a wager total of 2 associated with player P1.

The processing then returns again to step 402, and the next chip is detected. This is chip number 62. At step 403 it is determined that chip number 62 is within the jackpot bet zone 32, and thus processing moves to step 409 to determine whether there is another chip adjacent or overlapping chip number 62.

The result of the determination at step 409 is that there is no chip touching or overlapping with chip 62, and processing moves to step 410. The chip allocation module 204 signals to the game controller that a jackpot bet of value 1 unit has been detected at coordinate position X1Y1. The game controller 201 updates the jackpot game betting table 211 to show position X1Y1 and a corresponding jackpot bet of one unit.

Processing moves to step 411, betting chip 62 is flagged as having been processed and via steps 407 and 408 processing returns to step 402 to detect the next chip.

The next four chips to be processed are the chips 63, 64, 65 and 66 in player jackpot bet area 21$bj$, associated with player position P2. Since all of the chips 63 to 66 are detected in the bet area 21$bj$, it is not necessary to determine whether they are a group or not and thus by a series of iterations through steps 403, 404, 405 and 406 the game controller 201 updates the jackpot game betting table 211 to show a total wager of four units in association with player position P2.

The next chip to be processed will be chip 67, the centre of which is within the jackpot bet area 32. In the illustration, betting chip 67 extends partially over the boundary line 31, but since its centre is within the zone 32 it is recognised as a jackpot bet at coordinate position X2Y2, in the manner described above in relation to betting chip 62.

The next chip to be processed will be chip 68 whose centre is also within the zone 32, and at step 409 the chip allocation module 204 determines that the centre of chip 68 is spaced by a distance equal to or less than the chip diameter R from the centre of chip 69. Processing moves to step 412 where the chip allocation module 204 determines the mean position of the centres of betting chips 68 and 69 and determines that there are two chips in this group.

At step 413, chip allocation module 204 then sends a signal to the game controller 201 to indicate the main position X3Y3 of the centres of chips 68 and 69, and the value 2. Game controller 201 then updates the jackpot game betting table 211 to show a wager of two units corresponding to position X3Y3.

At step 414 chips 68 and 69 are flagged as having been processed, and the processing returns via steps 407 and 408 to step 402. By repeating the process described above in relation to chip 63, the chip allocation module 204 proceeds to locate the remaining chips 70 to 76 update the jackpot game betting table 211 to show a wager of six units in relation to player position P 4, and a wager of one unit associated with player position P 6.

In a similar fashion, the chips present in the player's betting areas 21ab to 21fb are detected and processed, and these are recorded in the main game betting table 212, the total value of the chips in each of the players' betting areas 21ab to 21fb being recorded in association with the respective player positions P1 to P6. In the example illustrated in FIG. 3, the player at position P1 has placed six chips in his bet area 21ab, the player at position P2 has placed two chips in his bet area 21bb, the player at position P3 has placed three chips in his bet area 21cb and the player at position P4 has placed a total of nine chips in his betting area 21db, made up of a chip of value 5 and four chips of value 1.

At this point, step 407 determines that there are no further unprocessed chips and the process then ends.

The result of detecting the chips illustrated in FIG. 3 is the jackpot game betting table 211 and the main game betting table 212 shown in FIG. 2.

When all of the chips have been detected and allocated, and recorded in the jackpot game betting table 211 and the main game betting table 212, play proceeds in the main game, winners and losers are determined, and the wagers are resolved.

The information in the jackpot game betting table 211 may be retrieved by the game controller 201 and sent to the output unit 218 to be displayed on the display modules 13 associated with the tables 10. The display module 13 at each table may, when jackpot bets have been detected, display as a graphical and/or textual representation a list of the players who have placed jackpot wagers placed and their corresponding amounts. This may be done by displaying on the display 13a a graphical representation of the gaming table and the betting chips thereon, optionally overlaid with captions indicating the players who placed each of the bets. Jackpot bets placed in the communal jackpot betting area 32 may be assigned captions such as "Mystery player 1" or "Mystery player 2", the names being allocated on the basis of the timing of the placing of the bet or the position of the chips in the betting area 32. Jackpot bets placed from remote terminals may be represented by images of chips placed as jackpot bets in the communal betting area 32 and may be assigned captions for example "Slot 1", "Slot 2". Jackpot bets placed from mobile gaming devices 11 may likewise be represented as jackpot bets in the communal betting area 32, and may be assigned captions for example "Mobile 1", "Mobile 2".

Alternatively, the display module 13 may simply display a list correlating the player positions and jackpot bets placed, displaying a caption such as "Mystery Player 1" in relation to each of the jackpot bets located in the area 32, such as "Slot 1" in relation to each of the jackpot bets placed from a remote terminal, and such as "Mobile 1" in relation to each of the jackpot bets placed from a mobile gaming apparatus.

In a further alternative, the display module 13 may display a graphical representation of the table showing the disposition of chips on the playing surface, and in addition may display a listing of the jackpot bets placed from remote terminals 10 and/or mobile devices 11.

Where a jackpot game is being played at multiple tables, the display module at each table may sequentially display graphical representations of each of the tables, or may display a composite graphical display showing all of the tables and the wagers in the jackpot game placed thereon.

In a further alternative, the display module may simply display the total number of jackpot bets placed in the particular jackpot game, and/or the total amount wagered in those jackpot bets.

Information from the jackpot game betting table 211 concerning the wagers placed in the jackpot game is sent to the jackpot controller 213, which includes an allocation module 214, a result module 215, a player selection module 216 and an output module 217.

Figure 5:
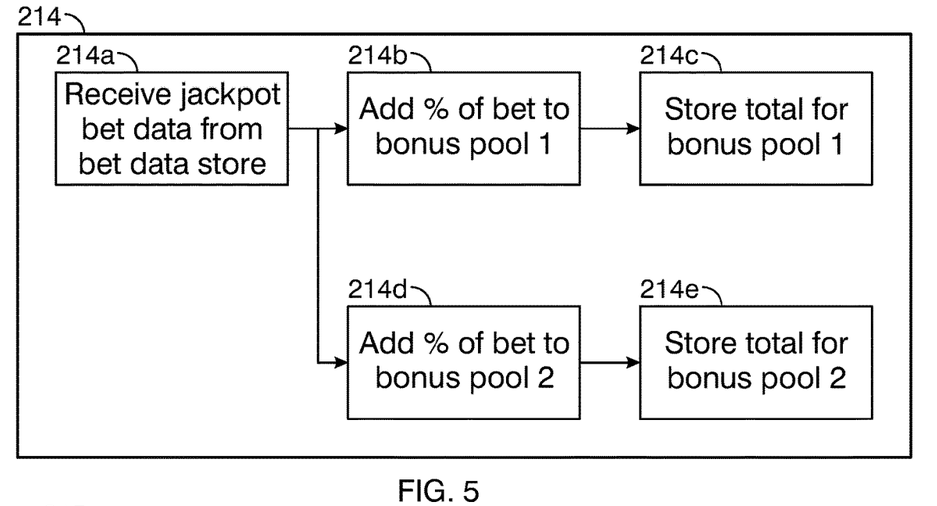
FIG. 5 schematically illustrates the distribution of jackpot bet monies between bonus pools.

The allocation module 214 firstly allocates portions of the jackpot wagers to one or more jackpot game bonus pools, and maintains a running total for the or each bonus pool. The allocation module 214 is schematically illustrated in FIG. 5. A receiver unit 214a receives data concerning the amount of each jackpot bet. Arithmetic unit 214b then calculates a portion of the jackpot bet amount to be allocated to bonus pool number 1 and adds it to the current total of bonus pool 1, which is then stored in totaliser 214c. A further percentage of the jackpot bet amount is calculated in arithmetic unit 214d and is added to the current total of bonus pool 2, which is stored in totaliser 214e.

The result module 215 then determines whether or not the jackpot has been won during this round of the main table game. The result module 215 is illustrated in schematic detail in FIG. 6. In this embodiment, the result module 215 includes a random number generating unit 215a which has a random number generator 215b and a memory 215c for storing ranges of numbers. The memory 215c stores a range corresponding to each of the bonus pools. The random number generator 215b operated to generate a random number N1 for bonus pool 1, and a random number N2 for bonus pool 2. The random numbers N1, N2 are chosen to be within the respective predetermined ranges, stored in the memory 215c. The random number N1 is then compared, in a comparator 215d, with the current bonus pool total for bonus pool 1, and the result of this comparison is passed to a determining unit 215e.

Figure 6:
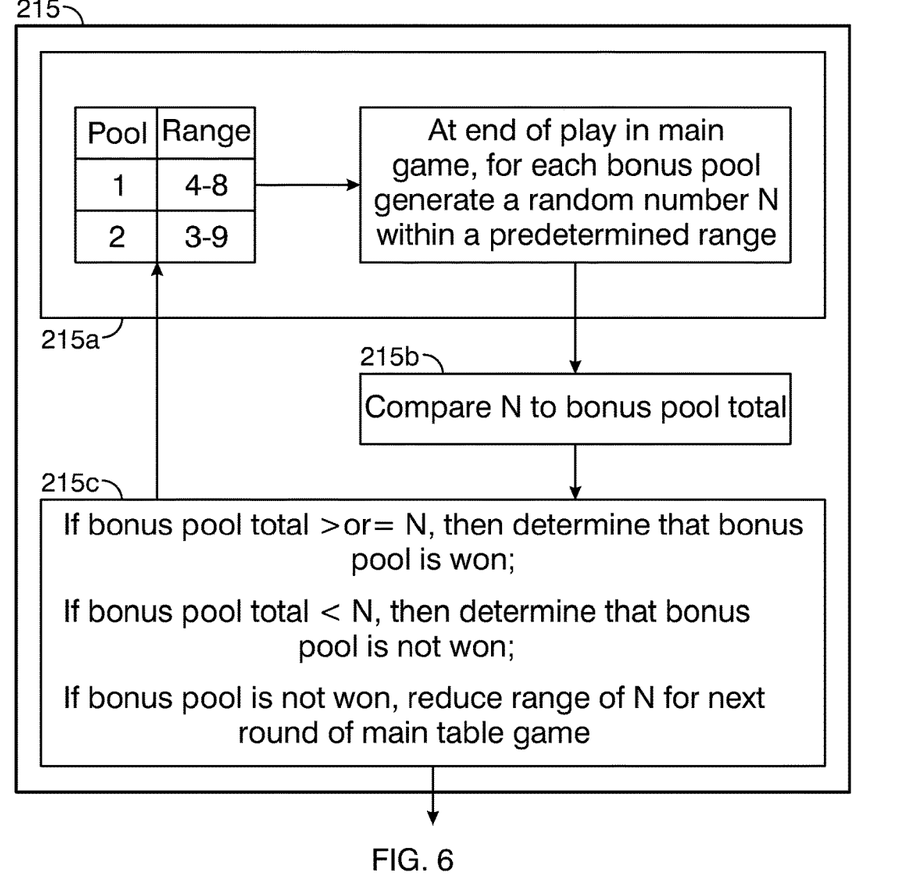
FIG. 6 schematically illustrates the determination of whether or not a jackpot is won.

If the current total for bonus pool 1 is greater than or equal to the random number N1, the determining unit 215e outputs a signal to the player selection module 216 indicating that the bonus pool has been won. If the current bonus pool total is less than the random number N1, the determining unit 215e outputs a signal to the output module 217 indicating that the bonus pool has not been won, and updates the memory 215c to reduce the permissible range of values for N1 at the next round of the main table game. Likewise, for bonus pool 2 the comparator 215d compares the random number N2 with the total for bonus pool 2 and determining unit 215e determines whether bonus pool 2 has been won or not, and either outputs a win indication to the player selection module 216, or outputs a no-win indication to the output module 217 and updates the range stored in the memory 215c in relation to bonus pool 2.

If the output module 217 receives "no-win" signals in respect of all of the bonus pools, indicating that none of the bonus pools have been won, the output module 217 notifies the game controller 201, which may then send signals to display modules 13 and the display boards 40 to indicate that no jackpot has been awarded. The display boards 40 may be illuminated, for example by providing flashing illumination round the jackpot bets to indicate that these are losing bets and should be cleared from the table. The main casino table game can then proceed to its next round.

Figure 8:
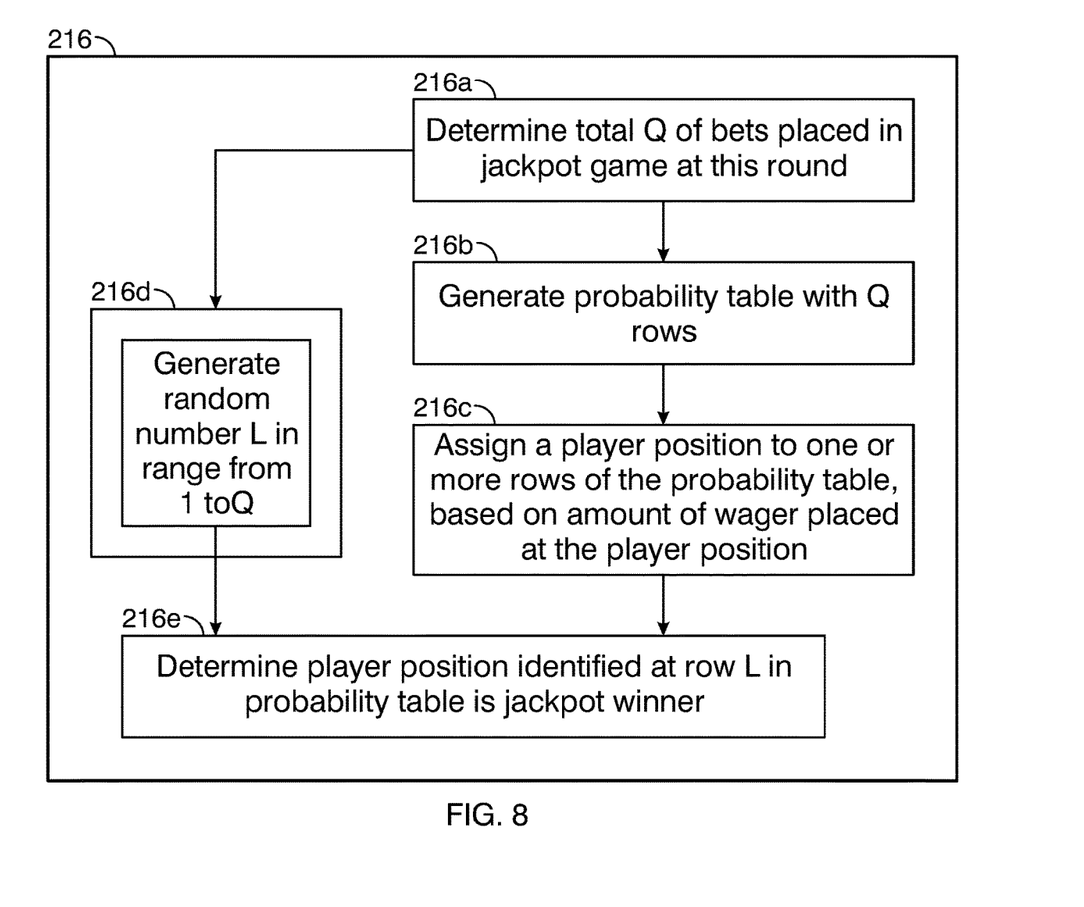
FIG. 8 illustrates the process for selecting the jackpot winner from amongst participating players.

If the determining unit 215 determines that one or more of the bonus pools has been won, a "win" signal in respect of each of the bonus pools won is passed to the player selection module 216, which determines the winning player for each bonus pool. The player selection module 216 is schematically illustrated in FIG. 8, and FIG. 9 shows an example of a probability table used for selecting the winner.

Figure 9:
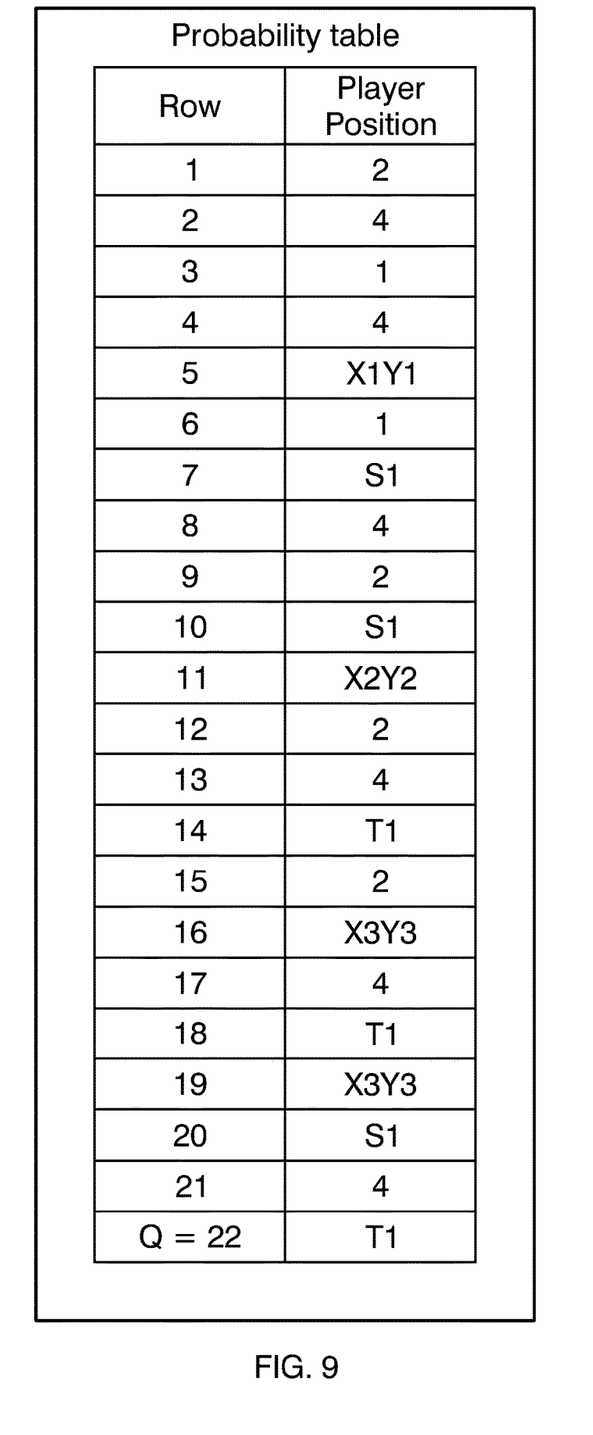
FIG. 9 illustrates a probability table used in the selection of the winner.

When a win indication is received, the player selection module 216 generates the probability table, illustrated in FIG. 9. Adder 216a of the player selection module first determines the total value Q of the bets placed in the jackpot game at this round of the game, and table generator 216b constructs a probability table having Q rows. In the present example illustrated in FIG. 9, the probability table has 22 rows to correspond to the total of the wagers recorded in the jackpot game betting table 211 of FIG. 2. In the probability table illustrated in FIG. 9, the "player position" information relates only to one gaming table, one remote terminal S1 and to a single mobile gaming device TI. Where the jackpot game is being played over a number of different gaming tables, then the "player position" information will indicate not only the position P1, P2 etc of a seated player or the XY coordinates of the detected wager, but also will indicate the gaming table 10 at which the player is seated or on which the wager has been detected. Likewise, when the jackpot game is also being played by users of one or more remote terminals 10c such as slot machines, then the "player position" information will indicate the identity S1 etc of each slot machine or remote terminal, and the amount wagered by the player at that terminal.

Assigning unit 216c then assigns player identifications to the rows of the probability table, in accordance with the value of the jackpot bet placed by each respective player. For example, a player who has placed a jackpot bet of four units will be assigned to four rows in the probability table. The assigning unit 216c may randomly assign the player identifications to the rows in the probability table, provided that the correct number of rows are allocated to each player. Alternatively, the rows may be assigned in blocks in accordance with the value of each player's wager. In the example illustrated in FIG. 9, a total of 22 units has been wagered on the jackpot game, and thus the probability table has 22 rows. The player positions are distributed randomly amongst the rows 1 to 22. If the rows of the probability table were to be assigned in blocks, then because the player at position P1 has made a jackpot bet of two units, the assigning unit 216c could simply assign rows 1 and 2 to player P1, rows 3 to 6 to player P2, and so on. Using this method of allocation, rows in the probability table may be allocated sequentially as betting chips are detected in the jackpot betting zones, and/or as remote or mobile gaming machines are used to place jackpot bets. The probability table may thus be prepared for each round of the main table game in advance of, or at the same time as, the step of determining whether the jackpot is or is not won. Processing time is thus saved.

In the present example, the player seated at table position P1 has placed a wager of two chips on the jackpot game, and thus player position P1 is randomly assigned two of the rows of the jackpot table by the assigning unit 216c. In this example, rows 3 and 6 of the jackpot table are assigned to player P1. Likewise, the player at position P4 has placed six chips on the jackpot bet area 21dj, and thus is allocated six rows (rows 2, 4, 8, 13 and 21) in the probability table. The player at the remote terminal 10c identified as S1 placed a wager of three units in the jackpot game, and rows 7, 10 and 20 of the probability table are allocated to the player position S1. The assigning unit 216c continues until every row of the probability table is assigned to a player.

The player selection module 216 includes a random number generator 216d, which receives from the adder 216a the value Q, and generates a random number L in the range from 1 to Q, for each bonus pool which has been won. The random number L is sent to a determining unit 216e, which determines that the player identified at row L of the probability table is the winning player for that bonus pool.

The output module 217 then sends to the game controller 201 the identity data of the winning player (or the table identifier and XY coordinates of the winning bet), and optionally also the total of the jackpot bonus pool which the player has won.

Figure 7:
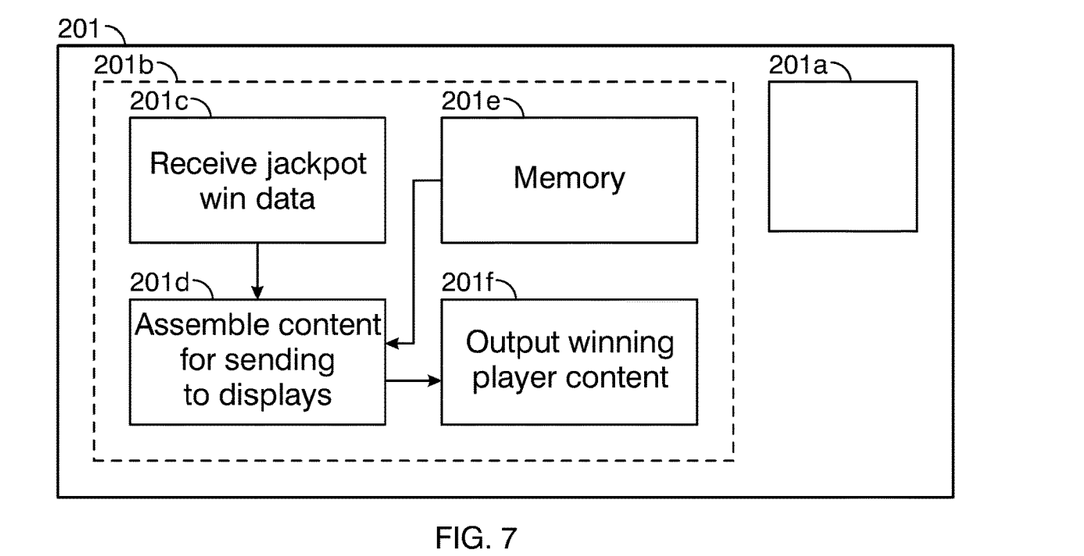
FIG. 7 illustrates the operation of the game logic when a jackpot win is determined.

FIG. 7 schematically illustrates the game controller 201, which includes a gaming module 201a which receives inputs and makes outputs relating to the main casino table game. The game controller 201 also includes a jackpot win sequence unit 201b comprising a receiver 201c, a display compiler 201d, a memory 201e and an output unit 201f.

When the details of the jackpot winning player or players are received from the output module 217, the receiver 201c receives the data and passes it to the display compiler 201d which, on the basis of the winner's identity (the player position and table number) or the coordinates of the winning wager (the XY coordinates and the table number if applicable) or the identity of the mobile gaming device or remote terminal, obtains from the memory 201e one or more animation sequences, static displays, photographs, or other data which will be shown on the display modules 13, and optionally also animated sequences for display on the display boards 40 of the gaming tables 10, and compiles a display sequence. In a preferred embodiment, the display sequence will consist of two parts, an initial generic display indicating that the jackpot has been awarded, and a final specific display identifying the winning player or players. When the display compiler 201d has assembled the content for display on the display modules 13 and by the display boards 40 of the gaming tables 10, the content is passed to the output unit 201f. The memory 201e of the jackpot win sequence unit 201b may include a number of pre-defined display sequence images and animations, as well as images or video clips of players, which may also be accompanied by sounds. The display compiler 201d may search in the memory 201e for an image or video clip associated with the winner, and include this video sequence or image in the assembled content.

The output unit 210f then sends output signals to the display modules 13 and the display boards 40 of the tables 10, to indicate that the jackpot has been won, and to indicate the winning player.

The winning player may be indicated by LEDs 41 from the display board 40 illuminating all or part of the player's jackpot bet area 21aj-21fj if the jackpot has been won by a player seated at the gaming table 10. If the jackpot is won by a player who has placed his jackpot wager in the jackpot zone 32, the game controller 201 may output signals to the LEDs 41 surrounding the winning jackpot bet so that the winning jackpot bet is indicated, for example by being encircled by lights, or by having an arrow point at the winning chip or chips, or by some other display. The display may be static or may be animated.

If the winning player is a user of a mobile gaming device 11 or a mobile terminal 10c, display content will be sent from the gaming server 12 to the mobile gaming device 11 or terminal 10c, for display to the user. The display content may be both audible and visible. Additionally, the display modules 13 may be caused to display an indication that the jackpot has been won, and/or an indication of the winning player. These indications may be simultaneous or sequential, for example the display may firstly indicate that the jackpot has been won, and subsequently indicate the identity, location or playing position of the winning player.

When a jackpot has been won, the running total of the relevant bonus pool is reduced by the amount awarded to the winner, losing jackpot bets are cleared from the table or debited from the account of the mobile gaming device user 11, and the next round of the main table game commences. At this point players are invited to make further jackpot bets by placing chips on the jackpot betting areas or via mobile gaming devices, and the cycle is repeated.

Alternative Embodiments

In the illustrated embodiment shown in FIG. 1, a card dealing shoe S is used in the main game being played on the casino table, the shoe S being linked to the gaming server 12 to supply information concerning the main casino game. In alternate embodiments, the gaming table 10 may be used to play roulette or Sic Bo, and the card shoe S will then be replaced by the appropriate roulette wheel or Sic Bo dice shaker apparatus, again linked to the gaming server 12 to provide game information to the gaming server for play in the main casino game. In addition to the customary betting layouts for roulette or Sic Bo, one or more betting areas will be provided for patrons to place jackpot bets. As described in the principal embodiment, where a table has a number of fixed seating positions for patrons, then each patron may have his own jackpot betting area and a further communal jackpot betting area may be delineated so that players not seated at the table may place jackpot bets by placing chips in the communal jackpot betting area.

In a further alternative, a card game such as baccarat, blackjack or poker may be provided as the main casino game on the table 10, with a live dealer handling the cards. Each player may have his own jackpot betting area and a further communal jackpot betting area may be delineated so that players not seated at the table may place jackpot bets by placing chips in the communal jackpot betting area. The dealer may be provided with an information input device to provide information to the gaming server 12 concerning the main casino game. It is further foreseen that the gaming table 10 may be a craps table, and may have a jackpot bet zone provided for patrons to place jackpot bets in addition to the usual betting areas provided.

The gaming tables in the illustrated embodiment are described as having a baize playing surface. While this is preferred for casino games involving cards, it is foreseen that the playing surface may be of any material, provided that the illumination from the display board beneath the playing surface is visible to the players. The playing surface may be a sheet of plastics material or glass, or may be a woven fabric or a felt.

As an alternative to the video camera and image processing system used to locate betting chips on the gaming table, the display board 40 may include, as well as LEDs 41, one or more sensors to detect the position of a chip placed on the table. These sensors may, for example, comprise an array of photosensitive elements arranged beneath the areas where chips may be placed, and which detect the presence of chips by the shadow produced at a number of the photo sensors when a chip is placed on the baize surface. The table may be strongly illuminated from above using either visible light or invisible light such as ultraviolet or infrared light, so that placing a chip on the baize causes a strong shadow on the sensor or sensors beneath the chip. By processing the returns from the array of sensors, the positions of chips placed on the baize may be determined and fed to the game controller 201 for processing substantially in the manner described above.

In a further alternative, the table may be illuminated from beneath the baize, for example by LEDs 40, and an array of photosensitive detectors may be integrated into the display board 40 to detect light reflected back from the undersides of the betting chips placed on the baize surface.

In a yet further alternative embodiment, the individual betting chips may be equipped with RFID devices, which can be sensed by an RFID detector array mounted on or adjacent the display board 40 in order to establish the position of the chip on the table, whereupon processing will ensue to determine whether the chip is in a player's betting area 21ab-21fb, a player's jackpot area 21aj-21fj, or in the jackpot zone 32. The placing of chips on the table may be determined by any suitable detection devices, such as capacitive or weight sensors provided in the table, provided that the detection devices are able to give an output indicating the position of the chip on the table and optionally assign a value to the chip.

In any of the above embodiments, the betting chips may be removed from the gaming table 10 by the table operator at any point after the positions and optionally the values of the betting chips have been captured and recorded in the bet data store 210. The game controller 201 may send outputs to the display boards 40 of the gaming tables 10 in order to display images at the positions in which betting chips were placed, optionally indicating the value of the bet placed at that position. The image may be an image of the chips which were detected at that position, or may be an image or avatar representing the player who placed the chips at that position, captured either by the video camera 14 or stored in a memory, for example the memory 201e, in the gaming server 12. The images may be static or animated.

The display board 40 may extend under the entire playing surface of the table 10, and data from the game controller relating to the main table game may be used to display animations, images or data in the individual player areas of the table. For example, a player who is a winner in the main table game may be rewarded with an animation displayed on his player area 21*ac*-21*fc*. In a further alternative, the display board 40 may be used for example to display on the players area 21*ac*-21*fc* an amount of winnings made by the player in that round, to assist the dealer in making accurate payouts.

In a further alternative, the gaming table 10 may be a simple gaming table without any display capability, and the identification of winning bets may be made by identifying the winning bet on a display shown on the display module 13 rather than by a selective illumination of part or parts of the gaming table.

Figure 10:
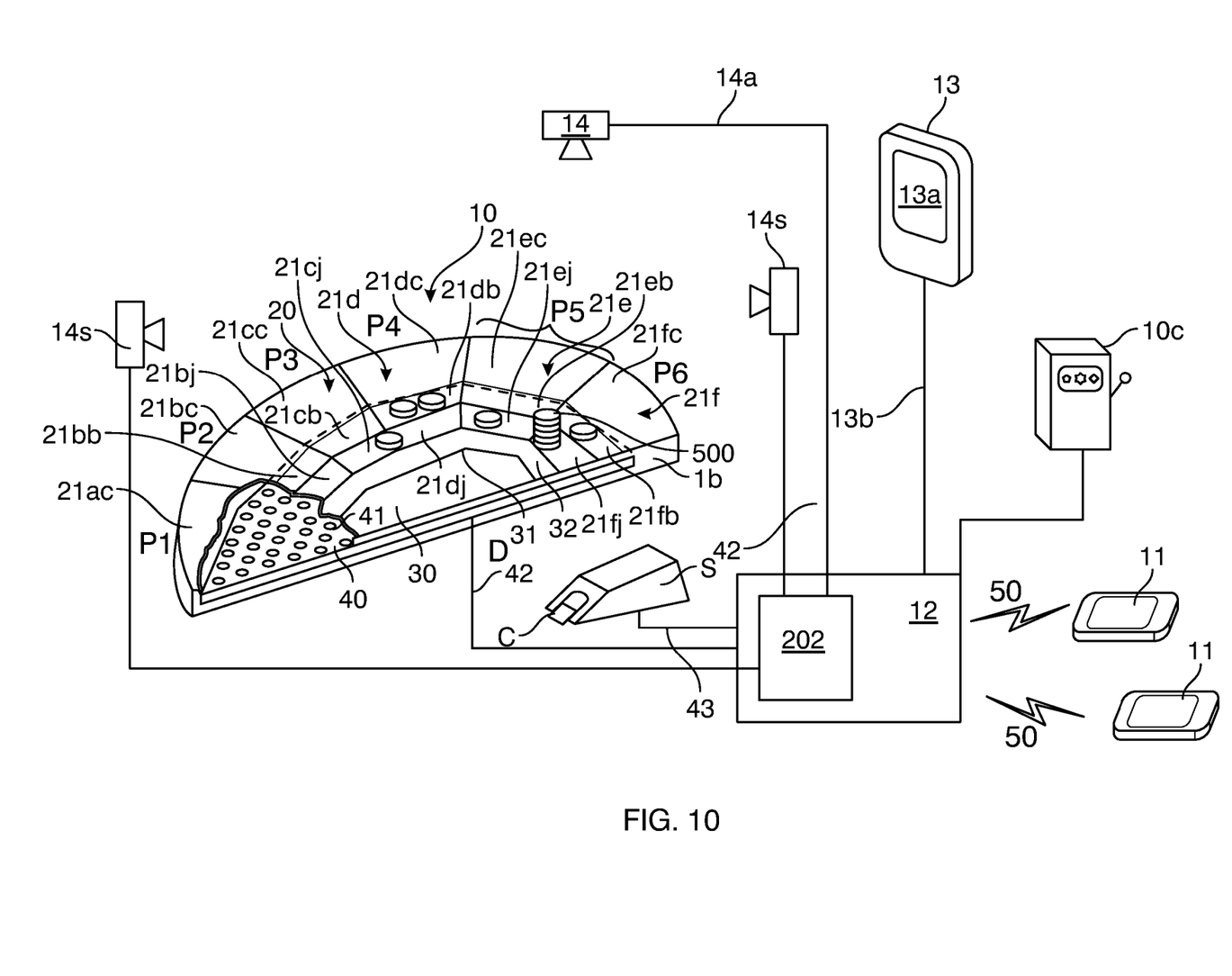
FIG. 10 illustrates a further embodiment of the invention, with additional cameras at table level.

In the embodiment illustrated in FIG. 10, a gaming table is illustrated similar to the gaming table 10 of FIG. 1. Like components illustrated in FIG. 10 are given the same reference numerals as in FIG. 1. In addition to the overhead video camera 14, the arrangement in FIG. 10 includes a pair of sideways-looking cameras 14*s* positioned at opposite ends of the gaming table, so as to be able to look across the gaming table. Three or more cameras 14*s* may be used to provide full coverage of the table, so that a stack of gaming chips is not obscured from all of the cameras by another stack of gaming chips. An image of a stack of gaming chips 500 placed in the jackpot bet area 21*fj* of player position P6 will be captured by the video cameras 14 and 14*s*, and by processing the captured video images the number and also optionally the values of the chips in the stack 500 may be determined in order to assign a bet amount to the wager placed by the player at position P6. Once all the video images have been processed to detect and assign bet values to stacks of chips placed on the table either in individual players' betting areas or in the communal jackpot betting zone 32, then the processing continues as before to determine whether a jackpot has been won, and to determine the winner.

The invention claimed is:

1. A gaming apparatus comprising:
   a gaming table having a playing surface comprising:
      a first table area for playing a table game, and
      a second table area configured to receive a plurality of gaming chips representing a respective plurality of bets;
   a sensor apparatus configured to generate image data indicative of the playing surface;
   a display; and
   a game computer in communication with the sensor apparatus and with the display, the game computer comprising a memory device
   and a processor configured to:
      receive the image data from the sensor apparatus;
      determine, based on the image data, positions and respective values of the plurality of gaming chips;
      store, in the memory device, chip data indicating the positions and the respective values of the plurality of gaming chips;
      output the chip data for display on the display;
      determine, based on the chip data, a total value of the plurality of gaming chips;
      generate first random number data;
      determine that a jackpot has not been won by determining that the total value of the gaming chips within the second table area is less than the first random number data; and
      in response to determining that the jackpot has not been won, reduce a range of numbers from which the processor determines the first random number data for a subsequent round of play.

2. The gaming apparatus of claim 1, further comprising a plurality of gaming tables and a respective plurality of sensor apparatuses, each gaming table of the plurality of gaming tables comprising:
   a respective first table area; and
   a respective second table area;
   wherein the gaming computer is in communication with each sensor apparatus of the plurality of sensor apparatuses.

3. The gaming apparatus of claim 1, wherein the second table area comprises an area larger than a size of a gaming chip such that the plurality of gaming chips may be placed in a plurality of different locations within the second table area.

4. The gaming apparatus of claim 1, wherein the playing surface comprises more than one second table area, each second table area configured to accommodate a respective plurality of gaming chips.

5. The gaming apparatus of claim 1, wherein the sensor apparatus is configured to detect a gaming chip placed anywhere in the second table area.

6. The gaming apparatus of claim 1, wherein the sensor apparatus comprises an overhead camera.

7. The gaming apparatus of claim 1, wherein the sensor apparatus comprises an array of sensors disposed on or beneath the playing surface.

8. The gaming apparatus of claim 1, wherein the display comprises an illuminated display visible through the playing surface.

9. The gaming apparatus of claim 8, wherein the illuminated display comprises a light-emitting diode display board mounted below the playing surface.

10. The gaming apparatus of claim 8, wherein the illuminated display comprises a projector mounted below the playing surface.

11. The gaming apparatus of claim 8, wherein the illuminated display provides a visible delineation of the second table area or areas on the playing surface.

12. The gaming apparatus of claim 1, wherein the display comprises an overhead projector.

13. The gaming apparatus of claim 12, wherein the overhead projector comprises a scanning laser.

14. The gaming apparatus of claim 12, wherein the overhead projector projects non-visible light which causes the playing surface, or marks on the playing surface, to fluoresce so as to provide a visible indication.

15. The gaming apparatus of claim 1, wherein the processor is configured to cause the display to make a visual display at a position of a gaming chip.

16. The gaming apparatus of claim 1, wherein the processor is configured to determine the respective values of the gaming chips by determining, based on the image data, a respective characteristic comprising a size, color, or shape of each gaming chip of the plurality of gaming chips.

17. The gaming apparatus of claim 16, wherein the memory is configured to store the chip data comprising the position and the respective characteristic of each gaming chip of the plurality of gaming chips.

18. The gaming apparatus of claim 1, further comprising a remote gaming device configured to send identification data to the processor which identifies the remote gaming device, and wherein the processor is configured to store in the memory the identification data of the remote gaming device as a respective position within the chip data.

19. The gaming apparatus of claim 1, wherein the processor is configured to determine that the jackpot has been won by determining that the total value of the gaming chips within the second table area is greater than or equal to the first random number data.

20. The gaming apparatus of claim 19, the processor of the game computer being further configured to:
generate second random number data in response to the processor determining that the jackpot has been won;
select a position of a gaming chip from the chip data based on the second random number data; and
coordinate activation of the display in a predetermined display sequence to indicate the selected position.

21. The gaming apparatus of claim 20, wherein the memory comprises a probability table having a number of rows, each row associated with a respective position of one of the plurality of gaming chips, and the processor is configured to generate the second random number data in a range equal to the number of rows in the probability table.

22. The gaming apparatus of claim 21, wherein each detected position is associated with a subset of rows in the probability table.

23. The gaming apparatus of claim 22, the processor further configured to add a total value represented by the gaming chips within the second table area, and generate a probability table having a number of rows equal to the total value of the gaming chips within the second table area.

24. The gaming apparatus of claim 23, wherein each subset of rows of the probability table associated with the respective position is equal to a value of gaming chips placed at the respective position.

25. The gaming apparatus of claim 18, wherein the remote gaming device comprises a mobile gaming apparatus or a fixed gaming device or terminal.

26. The gaming apparatus of claim 18, wherein:
the remote gaming device is configured to send signals to the processor further comprising a wager value which;
wherein the memory comprises a probability table having a number of rows, each row associated with a respective position within the chip data;
the processor is configured to generate the second random number data in a range equal to the number of rows in the probability table; and
the processor is configured to store in the probability table the identification data as the respective position in association with a subset of the number of rows of the probability table equal to the wager value.

* * * * *